United States Patent Office 3,387,369
Patented June 11, 1968

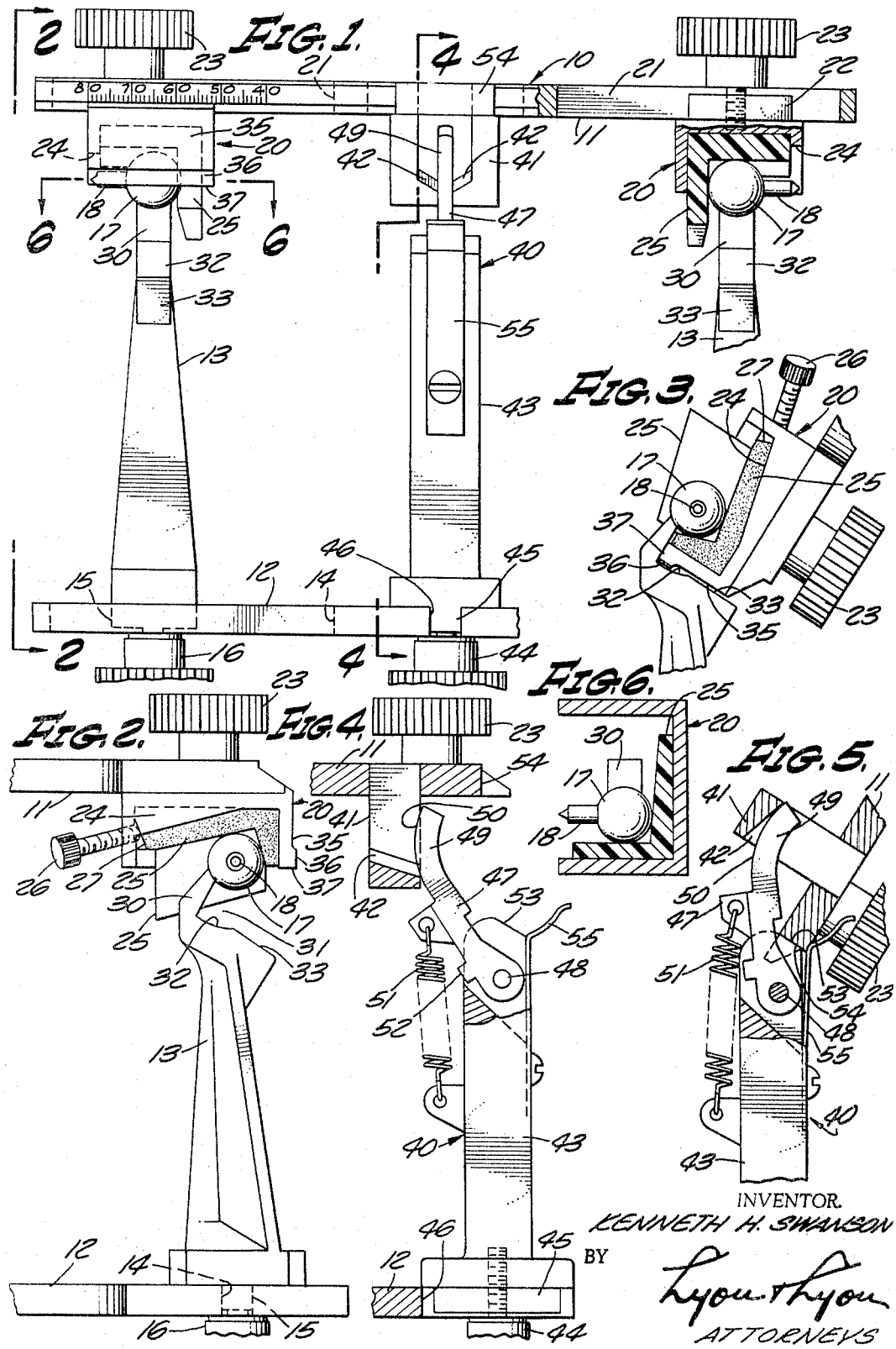

3,387,369
DENTAL ARTICULATOR
Kenneth H. Swanson, % California Lutheran College
Centrum, 60 W. Olsen Road, Thousand Oaks,
Calif. 91360
Filed Feb. 10, 1966, Ser. No. 536,497
8 Claims. (Cl. 32—32)

This invention relates to dental articulators and, in particular, is directed to an improved structural relationship among the interengaging components of a dental articulator of the type which has readily separable upper and lower frames whereby the upper frame can be pivoted between the closed and open positions and retained in an open position without falling off the lower frame. A dental articulator of this general type having separable frames is shown in my U.S. Letters Patent 3,206,852 although it will readily appear and be understood by those skilled in the art that this invention can be incorporated with various other dental articulators. However for convenience of description and to promote a complete understanding this invention will be described in relation to the articulator of my aforementioned patent.

A dental articulator is used in the construction of various dental appliance work such as dentures and bridges. Models of the upper and lower teeth are mounted in the respective frames of the dental articulator and the dental appliances are built on the models. The proper mating and lack of interference between the new dental appliance and existing teeth or between complete dentures is continually verified during construction of the dental appliance by manipulating the respective frames of the dental articulator to simulate the relative movements of the human jaws as well as that articulating function can be accomplished by the particular articulator. Thus in the use of a dental articulator it must be repeatedly opened and closed in the continuing process of construction and verification. With certain types of dental articulators such as that disclosed in my aforementioned patent, the upper and lower frames are readily separable since there is no permanent hinge connection therebetween. Only an interengagement between shaped surfaces on the two frames is provided for simulating the relative movement between the human jaws. While this separability is highly desirable during many phases of the use of the dental articulator, there are certain other phases wherein it is more desirable to be able to pivot the upper frame to an open position permitting work on either the upper or lower jaw models without detaching the upper frame from the lower frame. However the incorporation of this non-detachable feature must not adversely affect or interfere with the normal manipulation of the dental articulator for simulating the jaw movements. The integration of these more desirable features is particularly elusive with a dental articulator of the type disclosed in my afore-mentioned patent since the "hinged" connection between the upper and lower frames consist of only a pair of condyle balls engaging a pair of open sockets.

By this invention there is provided a novel configuration of cooperating elements on the separable upper and lower frames of a dental articulator which permits the upper frame to be pivoted to an open position supported on the lower frame without separating the frames or detracting from the normal manipulation of the dental articulator. This is accomplished by providing an offset support for the condyles with a cooperating support for the socket members of the upper frame in the open positions and the interconnection is enhanced by spring biasing the respective components in a direction toward continual engagement.

It is an object of this invention to provide a novel form of cooperating components on the separable frames of a dental articulator for permitting the upper frame to be pivoted to an open position fully supported on the lower frame. Another object of this invention is to provide a novel form of separable support arrangement between the upper and lower frames of a dental articulator which permits pivoting to an open position but does not alter or inhibit the normal articulated juncture between the two frames. Still another object is to provide such an arrangement wherein releasable spring biasing means urges the frames to a centric relationship and maintains the interconnection of the two frames. A still further object of this invention is to provide a releasable means for retaining the upper frame in a full open position when desired.

Other objects and advantages of this invention will appear from the following description and the accompanying drawings wherein:

FIGURE 1 is a fragmentary rear elevation view of the articulator of this invention.

FIGURE 2 is a fragmentary side elevation of the rear portion of the articulator taken substantially on the line 2—2 shown in FIGURE 1 and illustrating the support relationship between the upper and lower frames in the closed position.

FIGURE 3 is a fragmentary side elevation view similar to FIGURE 2 but illustrating the support relationship in the fully opened position of the upper frame.

FIGURE 4 is a fragmentary sectional elevation of the rear portion of the articulator taken substantially on the line 4—4 and illustrating the centric guidance and biasing means with the frames in the closed position.

FIGURE 5 is a fragmentary sectional view similar to FIGURE 4 but illustrating the components in the fully opened position of the upper frame.

FIGURE 6 is a sectional plan view taken substantially on the line 6—6 in FIGURE 1.

Referring now in greater detail to the figures, a dental articulator, generally designated 10, of the type disclosed in my Patent No. 3,206,852 is shown. As previously mentioned, the invention is most advantageously incorporated with a dental articulator of this general type having similar problems in use but the uses of the invention are not limited solely to the articulator of my patent. Dental articulator 10 includes an upper frame 11 and a lower frame 12 between which the cast models of the patient's teeth are mounted with the upper jaw model mounted on the upper frame 11 and the lower jaw model mounted on the lower frame 12. These models are not shown in the drawings but are mounted to the left of that portion of the articulator shown in FIGURES 2 and 4. The forward extremity (to the left as viewed in FIGURES 2 and 4) of the upper frame is supported on the lower frame by either the cast models themselves or by a conventional incisal guide pin which is not shown. The rear extremity of the upper frame 11 is supported on the lower frame 12 by a pair of condyle posts 13 which project upwardly from the lower frame 12. The condyle posts 13 are mounted on frame 12 for lateral movement by the provision of a slot 14 in frame 12 into which fits a key portion 15 on the base of the posts 13. A thumb screw 16 is threaded into the bottom of posts 13 through the slot 14 and serves to clamp the posts 13 in the desired lateral position. The manner in which the positions for the condyle posts 13 is selected is not essential to an understanding of this invention but it is sufficient to say that the lateral separation between the posts 13 corresponds generally to the actual lateral separation between the mandibular joints of the particular patient. Each condyle post 13 has a spherical condyle ball 17 on the upper end which most closely approximates the average shape of the condyles of a person's lower jaw although it is to be understood that these condyle balls 17 may be of any other desired shape without departing from this invention. A pin 18 extends laterally outwardly from each condyle ball 17 and is used in making the original adjustment of the position of condyle posts 13.

On the upper frame 11 there are provided a pair of laterally adjustable mounting brackets 20 for positioning above the condyle posts 13. The upper frame is provided with a lateral slot 21 for receiving a key portion 22 on the bracket 20 for guiding the lateral movement and preventing rotation of the bracket 20. A thumb screw 23 passes through slot 21 into threaded engagement with the bracket 20 for selectively locking the bracket in the desired position. Bracket 20 includes downwardly depending walls on the front, rear and inwardly facing sides with a short edge wall 24 along the outwardly facing side of the bracket. In this manner bracket 20 forms a receptacle for a removable box 25 which from a cost and versatility standpoint is preferably of a plastic material. The box 25 is retained in the bracket 20 by set screw 26 threaded through the forward wall of the bracket 20 at an upwardly and inwardly inclined attitude for engaging an inclined surface 27 on the box 25. As more thoroughly described in my afore-mentioned patent, the box 25 serves as a receptacle for a formable material which is appropriately deformed by the condyle ball 17 upon the proper manipulation of the upper frame 11 relative to the lower frame 12 to form a condyle path in the material in box 25. This path is unique to the particular patient and therefore is cast in a hard setting material. The altered boxes are then mounted in the brackets 20 for use in constructing that patient's dentures or bridges. As thus far described it may be seen that the connection between the upper and lower frames of the articulator 10 is by means of the open boxes 25 resting on the condyle posts 13 whereby the upper frame 11 can be removed merely by lifting same and that opening pivoting (in a clockwise direction from the position shown in FIGURE 2) cannot be accomplished without the upper frame merely falling off the lower frame or requiring the operator to hold the upper frame in position.

Condyle posts 13 is provided with an offset arm portion 30 at its upper end for supporting the condyle ball 17. Arm portion 30 is offset in the forward direction from the center of condyle ball 17 whereby a rearwardly open undercut 31 is provided immediately below the condyle ball 17. At the base of arm portion 30 is provided an upwardly facing concave surface 32 having an arcuate radius of curvature aproximately equal to the distance of that surface from the center of condyle ball 17. An abutment surface 33 is provided rearwardly adjacent the arcuate concave surface 32. The depending rear wall 35 of the mounting bracket 20 includes a guide surface or edge 36 at its lower exterior end which by reason of the thickness of the rear walls of bracket 20 and box 25 is positioned a radial distance from the center of condyle ball 17 substantially equal to the radius of concave surface 32. Thus an upper frame 11 is pivoted toward the open position and reaches almost a vertical attitude, the guide edge 36 will engage the surface 32 for supporting the frame 11 directly on the condyle posts 13 now that the entire upper surfaces of the condyle ball 17 are exposed. In the fully opened position of upper frame 11 as shown in FIGURE 3 the rear wall 35 of bracket 20 engages the abutment surface 33 on the guide posts 13 and the lower edge 37 of rear wall 35 engages the offset support arm 30. The inside of rear wall of box 25 engages the underside of condyle ball 17 thereby completing the support of frame 11. It is to be noted that by this arrangement frame 11 can be pivoted more than 90° whereby the center of gravity of the combined upper frame 11 and upper cast model will be positioned at or slightly to the rear of condyle posts 13 for remaining open.

Laterally between the afore-described condyle posts 13 and brackets 20 is provided a centric guide and biasing assembly, generally designated 40, with interengaging components on the upper and lower frames. As will appear, the assembly 40 serves various functions separate and independent from the afore-described unique pivotal support between the condyle posts 13 and mounting brackets 20 but also serves the function of enhancing this unique pivoting arrangement. A guide channel 41 depends from upper frame 11 and has an opening therethrough with a pair of upwardly facing surfaces 42 at the lower extremity of the opening. Surfaces 42 are inclined downwardly, rearwardly and toward each other with the line of intersection of the surfaces positioned at the lateral center of the articulator. The guide assembly 40 also includes a guide post 43 removably mounted on the lower frame 12 by means of a thumb screw 44 threadedly engaging the base of the post with a key portion 45 slidably engaging a slot 46 in the lower frame to prevent rotation of the guide post. An arm 47 is pivotally mounted by a pin 48 near the upper end of guide post 43 and extends upwardly and forwardly toward the guide channel 41. The arm 47 is provided with a curved end portion 49 which has a rounded edge 50 for engaging the inclined surfaces 42. A coil tension spring 51 extends between arm 47 and the guide post 43 for biasing the arm in a counterclockwise direction thereby urging the curved portion 49 forwardly and downwardly. The interengagement between the rounded edge 50 of arm 47 and the inclined surfaces 42 urges the upper frame 11 toward a centered or centric position so long as such urging is not resisted by the positions to which the condyle posts 13 and mounting brackets 20 are adjusted. Thus by loosely adjusting condyle posts 13 and mounting brackets 20 for ample lateral movement the centric position of the frames 11 and 12 is immediately established and this is of substantial assistance in various phases of the use of the articulator. Further the spring biasing of arm 47 tends to urge the upper frame 11 forwardly even during opening pivoting movement of the upper frame as may be seen by FIGURE 5. This assists in retaining the rear and upper walls of the box 25 in constant engagement with the condyle ball 17 throughout pivoting movement of the upper frame thereby preventing the frame 11 from falling off the condyles in a rearward direction. In effect this permits the upper frame 11 to be pivoted by the touch of a finger at the forward end rather than requiring gripping of the upper frame to prevent the rearward disassembling movement. However this spring biased condition does not prohibit the rearward manipulation of upper frame 11 for manual articulating movement to simulate the jaw movement. For very precise articulating motion the guide post 43 may be removed rearwardly thereby relieving the spring biasing force on frame 11. Arm 47 is provided with a stop 52 for engaging the guide post for retaining the arm in a position for engaging the guide channel 41 upon reassembly of the guide post to the lower frame. It is also to be noted that the upper frame 11 may be removed without removing guide post 43 by merely lifting the upper frame thereby causing the arm 47 to pivot rearwardly a small amount to clear the guide channel 42. Thus the versatility of being able to quickly remove the upper frame 11 is not lost.

The upper end of guide post 43 is provided with an abutment surface 53 for engaging the rear end 54 of upper frame 11 in the fully opened position shown in FIGURES 3 and 5. A leaf spring clip 55 is mounted on the rear side of guide post 43 and extends slightly beyond the abutment surface 53. The upper end of spring clip 55 is contoured to engage the rear end 54 of frame 11 during opening pivoting to spring outwardly and allow the frame to reach the fully opened position whereupon the spring clip 55 exerts a resilient force on the frame 11 to tend to maintain the frame in this full open position.

Thus by this invention there is provided a novel arrangement and configuration of the components of a dental articulator whereby the upper frame of the articulator may be conveniently pivoted between open and closed positions without becoming detached from the lower frame although the articulated joint between the frames is merely a pair of open socket and ball joints. Moreover a centric guidance function is performed by certain of the components. Having fully described my invention it is to be understood that I do not wish to be limited to the details herein set forth but rather my invention is of the full scope of the appended claims.

I claim:

1. In a dental articulator having separable upper and lower frames with condyle posts mounted on the lower frame and having shaped ends for engaging downwardly facing open sockets mounted on the upper frame to form the pivotal juncture between the frames, the improvement comprising; each said post having an offset portion supporting said shaped end forming a rearwardly open area beneath said shaped end, and each said open socket having a rear wall means normally depending adjacent said shaped end to limit forward movement of said upper frame and fitting under said shaped end in open positions of said upper frame thereby permitting greater than 90° opening pivoting of said upper frame.

2. In a dental articulator having separable upper and lower frames with condyle posts mounted on the lower frame and having shaped ends for engaging downwardly facing open sockets mounted on the upper frame to form the pivotal juncture between the frames, the improvement comprising; each said post having a forwardly offset support arm for said shaped end forming an undercut immediately beneath said shaped end, each said open socket having a depending rear wall means normally limiting forward movement of said upper frame by engaging said shaped end, said rear wall means fitting into said undercut upon opening pivoting of said upper frame thereby permitting greater than 90° opening pivoting of said upper frame, and each said condyle post and rear wall means having mating surfaces for slidably interengaging upon opening pivoting of said upper frame for supporting the upper frame in the substantially open positions.

3. The combination of claim 2 wherein said mating surfaces include an arcuately concave upper surface on said condyle post below said shaped end and undercut, and said concave upper surface having as the center of curvature the center of said shaped end.

4. The combination of claim 2 wherein each said condyle post and rear wall means include interengaging abutment means in the full open position of said upper frame arranged to support said upper frame.

5. In a dental articulator having separable upper and lower frames with condyle posts mounted on the lower frame and having shaped ends for engaging downwardly facing open sockets mounted on the upper frame to form the pivotal juncture between the frames, the improvement comprising; each said post having a forwardly offset support arm for said shaped end forming an undercut immediately beneath said shaped end, each said open socket having a depending rear wall means normally limiting relative rearward movement of said shaped end and fitting into said undercut upon opening pivoting of said upper frame, each said condyle post and rear wall means having mating surfaces slidably interengaging upon opening pivoting of said upper frame for supporting the upper frame in the substantially open positions, and a releasable biasing assembly connecting said upper and lower frames for resiliently urging said upper frame forwardly in all pivoting attitudes of said upper frame.

6. The combination of claim 5 wherein said releasable biasing assembly includes an arm mounted on said lower frame for pivoting about a lateral axis, a lateral surface on said upper frame adapted to be engaged by said pivotal arm, and means biasing said arm forwardly into engagement with said lateral surface.

7. The combination of claim 6 wherein said lateral surface is comprised of a pair of mutually and downwardly-rearwardly inclined surfaces facing upwardly and intersecting along the longitudinal center of said upper frame for said biased pivotal arm to resiliently urge said upper frame toward the laterally centered position.

8. In a dental articulator having separable upper and lower frames with rearwardly positioned condyle posts mounted on the lower frame having shaped ends for engaging downwardly facing shaped open sockets mounted on the upper frame to form the pivotal juncture between the frames, the improvement comprising; each said post having a forwardly offset support arm for said shaped end forming a rearwardly-open undercut immediately beneath said shaped end, each said shaped open socket having a downwardly depending rear wall means normally arresting forward movement of said upper frame by engaging said shaped end and fitting into said undercut upon opening pivoting of said upper frame thereby permitting greater than 90° opening pivoting of said upper frame, each said condyle post having an arcuately concave upper surface at said undercut, each said rear wall means having an exterior guide edge for slidably engaging said concave upper surface upon opening pivoting of said upper frame for supporting the upper frame in the substantially open positions, each said rear wall means and condyle post having cooperating abutment means interengaging in the completely open position of said upper frame, a centric guide hinge assembly comprising a guide member on said upper frame and a hinge post removably mounted on said lower frame, said guide member having a pair of rearwardly-downwardly and mutually inclined surfaces facing upwardly and intersecting along the longitudinal center of the upper frame, said hinge post having a pivotally mounted arm spring biased to engage said inclined surfaces and urge said upper frame forwardly and toward a laterally centered position, and a spring clip mounted on said hinge post in a position to resiliently engage said upper frame in said completely open position and so retain the upper frame.

References Cited

UNITED STATES PATENTS

| | | | |
|---|---|---|---|
| 3,160,955 | 12/1964 | De Pietro | 32—32 |
| 3,206,852 | 9/1965 | Swanson | 32—32 |
| 3,224,096 | 12/1965 | Stuart | 32—32 |

LOUIS G. MANCENE, *Primary Examiner.*

N. RUSHEFSKY, *Assistant Examiner.*